June 23, 1970   D. D. RHOADS ET AL   3,516,485

FOOD CONTAINER

Filed May 15, 1968                                    2 Sheets-Sheet 1

Inventors
DELMAR D. RHOADS
ROBERT H. MACKAY
by JEFFERS & YOUNG
Attorneys

United States Patent Office

3,516,485
Patented June 23, 1970

3,516,485
FOOD CONTAINER
Delmar D. Rhoads and Robert H. MacKay, Fort Wayne, Ind., assignors to Lincoln Manufacturing Company, Inc., Fort Wayne, Ind., a corporation of Indiana
Filed May 15, 1968, Ser. No. 729,306
Int. Cl. F25b 29/00
U.S. Cl. 165—27                                       4 Claims

ABSTRACT OF THE DISCLOSURE

A food container is provided with cooling means around its side walls and with heating means at its bottom. The cooling means and the heating means are selectively operated to maintain the container at cold temperatures or hot temperatures.

BACKGROUND OF THE INVENTION

Our invention relates to an improved food container, and particularly to an improved food container that can be selectively maintained at either cold temperatures or hot temperatures.

In kitchens, storage facilities, grocery stores, and similar places, food is frequently maintained at cold or very cold temperatures for long periods of time before it is utilized. The food may be either unprepared and frozen, or cooked and frozen. When the food is to be utilized, it is desirable to thaw the food as quickly as possible, or to thaw the food and heat it to a suitable temperature for eating. Previously, frozen or cold food had to be removed from the containers, and then thawed or heated. Such an arrangement required a container to maintain the food frozen or at the cold temperatures, and has required removal of the food from these containers to a location where the food could be thawed or heated. The thawing or heating of the food required another location or container to provide the necessary heat. Extra containers or locations and added handling have been required in order to thaw or heat the food. In some instances, there may not be enough time for the food to thaw at room temperatures, with the result that the food must be heated in a container. In summary, the previous arrangements have been unsatisfactory for these and other reasons.

Accordingly, an object of our invention is to provide an improved food container that can be selectively maintained at a cold temperature or a warm temperature.

Another object of our invention is to provide an improved food container which has both heating and cooling means for the same container in order to maintain the food in the container at a cold temperature, or in order to thaw or heat the food in the container.

Another object of our invention is to provide an improved food container which can maintain food a very cold or frozen temperatures for as long as desired, but which can be easily operated to thaw or heat the food in the same container very quickly.

Another object of our invention is to provide an improved food container having easily operated switches for maintaining the food container at a very cold temperature, at a moderate temperature, or at a hot temperature in order to maintain the food temperature accordingly.

SUMMARY OF THE INVENTION

Briefly, these and other objects are achieved in accordance with our invention by a food container having side walls and a bottom. The container may be mounted on a base if desired. Electrical heating means are positioned beneath the bottom, and cooling means are positioned around the walls of the container. An electrically operated refrigerating mechanism is mounted on the base, and connected to the cooling means. Electrical switches and thermostats are provided on the container in order to selectively energize either the electrical heating means, or to selectively energize the refrigerating mechanism through thermostats having the desired temperature settings. Thus, the container may be maintained at a cold temperature, but may be quickly thawed or warmed by operation of the switches.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
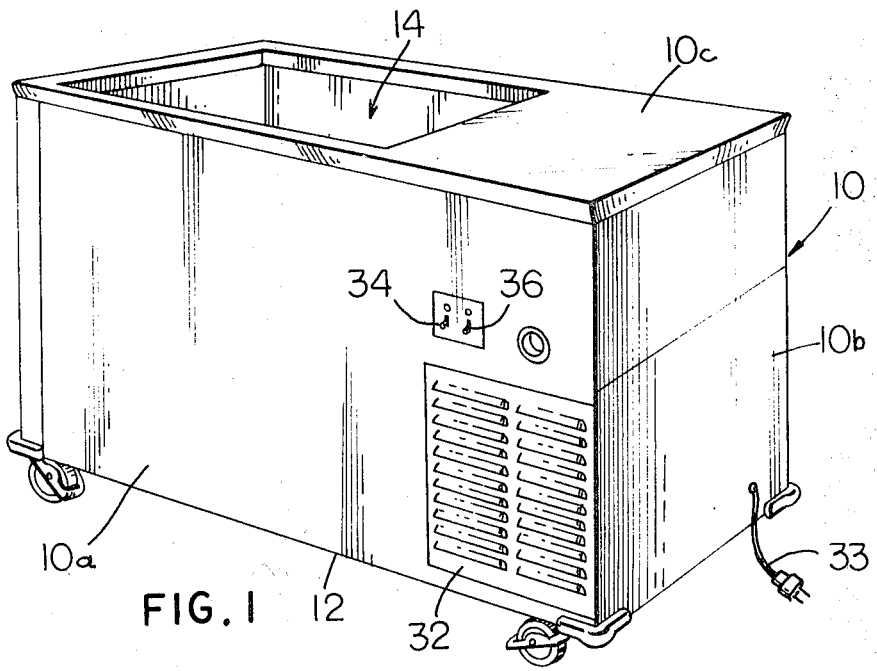
FIG. 1 shows an exterior perspective view of our improved food container.
Figure 2:
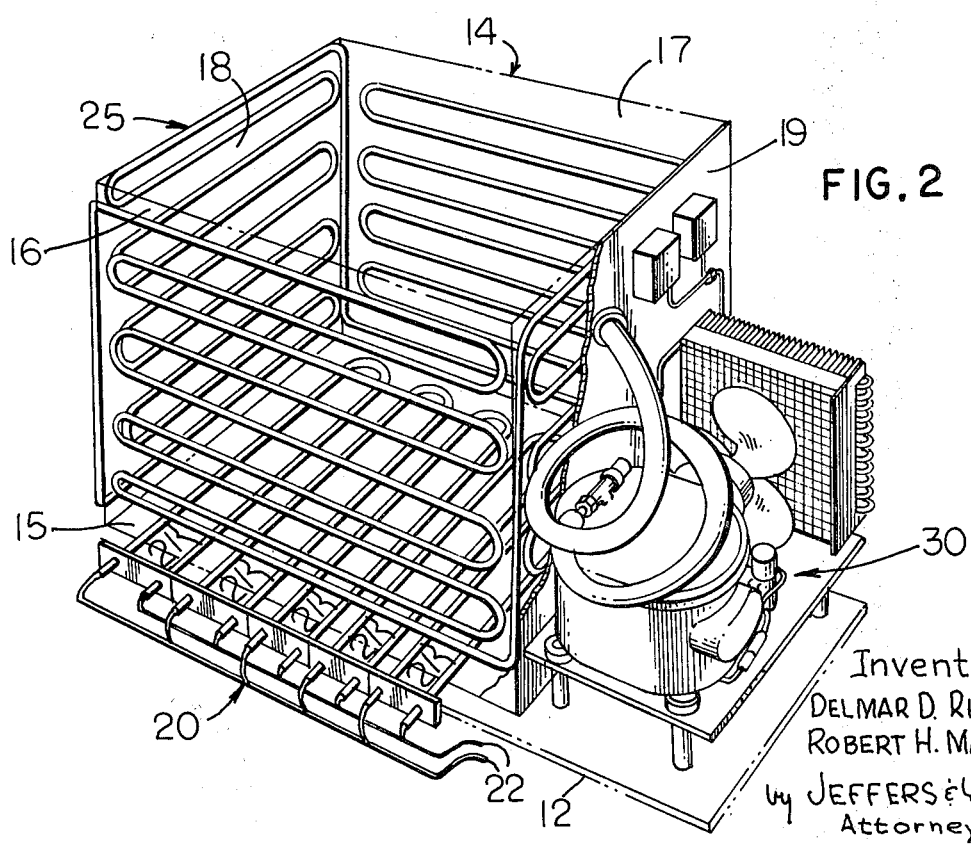
FIG. 2 shows a perspective view of the heating means, the cooling means, and the refrigerating mechanism for the container shown in FIG. 1.

FIG. 1 shows a food cart 10 utilizing a preferred embodiment of a container 14 in accordance with our invention. The food cart 10 is shown as being mounted on wheels or rollers to permit the cart 10 to be moved around. However, it is to be understood that our improved food container may be utilized in various forms, and may be either stationary or movable. The cart 10 is generally rectangular in shape, and is provided with a base 12. The container 14 in accordance with our invention is mounted on the base 12. As shown in FIG. 1, the container 14 is generally rectangular in shape, but may have other configurations if desired. With reference to FIG. 2, as well as FIG. 1, the container 14 is comprised of a rectangular bottom 15 having a selected size and shape, two rectangular sides 16, 17 and two rectangular ends 18, 19. The sides 16, 17 and the ends 18, 19 are mounted on and extend vertically upward from the bottom 15. The bottom 15, the sides 16, 17 and the ends 18, 19 are either fastened together or integral so that the container 14 is water tight. This construction may be provided in any suitable fashion, such as by welding. The container 14 is suitably mounted on the base 12 but is preferably spaced from the base 12 to permit heating means 20 to be placed under the bottom 15 and above the base 12.

The heating means 20 are preferably suitably insulated electrical heaters, such as a plurality of resistance or cal rods 21 which are arranged to provide as complete and uniform a distribution of heat to the bottom 15 as possible. The rods 21 may be electrically connected in any desired fashion, although we have shown the rods 21 as being connected in parallel to two electrical terminals 22 for connection to an electrical energizing circuit. Cooling means 25 are positioned around the sides 16, 17 and the ends 18, 19 to provide as uniform and complete cooling as possible to the sides 16, 17 and the ends 18, 19. These cooling means 25 may either be positioned around the inner faces of the sides 16, 17 and the ends 18, 19 or, preferably, may be positioned around the outer faces of the sides 16, 17 and the ends 18, 19. These cooling means 25 comprise refrigerant carrying coils which are generally configured as shown and connected in one complete length to refrigerating means 30. The refrigerating means 30 comprise any suitable device such as an electrically driven compressor and cooler. Since refrigerating devices are known in the art, we have not shown the specific details of the refrigerating means 30. The refrigerating means 30 shown in FIG. 2 is mounted on one end of the base 12 by suitable mounts which reduce vibration and shock.

The container 14 described in connection with FIG. 2 is mounted on the base 12 of the cart 10 of FIG. 1. The cart 10 may be provided with suitable sides 10a, ends 10b, and a top 10c as shown in FIG. 1. The top 10c preferably covers all of the cart 10 except for the upper opening of the container 14. The sides 10a may be provided with louvers 32 as shown in order to provide circulation of air to the refrigerating means 30. We prefer that heat insulation be positioned around the cooling means 25 and inside the sides 10a and the ends 10b so that the cooling means 25 cool the container 14 with as little cooling loss as possible. An electrical cord 33 is connected to the heating means 20 and to the refrigerating means 30 and brought out for connection to an electrical outlet.

Figure 3:
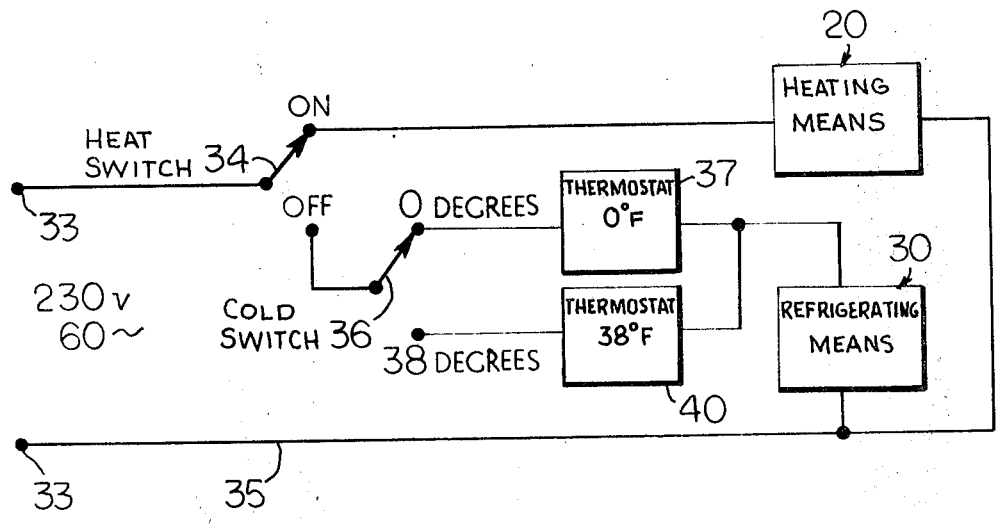
FIG. 3 shows an electrical circuit illustrating one arrangement of the electrical circuit for heating and cooling the container of FIG. 1.

FIG. 3 shows one electrical circuit for energizing the heating means 20 and the refrigerating means 30, and for providing an easy and quick transition between a cold temperature and a warm or hot temperautre, in the container 14. In FIG. 3, electrical power, preferably 230 volts 60 cycles, is supplied by the cord 33 to the movable contact of a single pole, double throw heat switch 34 and to a common bus 35. The heat switch 34 has two fixed contacts labeled "on" and "off." The "on" contact is connected to the heating means 20, and the other side of which is connected to the common bus 35. The "off" contact is connected to the movable contact of a single pole, double throw cold switch 36. The cold switch 36 has two fixed contacts labeled 0 degrees and 38 degrees. The 0 degrees contact is connected through a 0 degrees thermostat 37 to the refrigerating means 30, and the 38 degrees contact is connected through a 38 degrees thermostat 40. The thermostats 37, 40 may be any suitable type of thermostatic element which is responsive to the indicated Fahrenheit temperature so as to close an electrical circuit through the thermostat when the surrounding temperature is above its designated value, and to open the electrical circuit through the thermostat when the surrounding temperature is below its designated value. The thermostat 37 was selected to provide a temperature of zero degrees Fahrenheit, since this temperature keeps most foods solidly frozen. The thermostat 40 was selected to provide a temperature of 38 degrees Fahrenheit, since this temperature is a desired one for refrigerating food to prevent spoiling. The heat switch 34 and the cold switch 36 are preferably mounted on a side 10a of the cart 10 as shown in FIG. 1 so as to be easily accessible. These switches 34, 36 may also be provided pilot lights if desired. The thermostats 37, 40 are positioned on a suitable inner face of one of the sides 16, 17 or the ends 18, 19, or the bottom 15. Generally, it is preferable to mount the 0 degrees thermostat 37 near the top of the end or side having the cooling coils most distant from the refrigerating compressor. It is preferable to mount the 38 degrees thermostat 40 near the bottom 15.

As an example of operation of the circuit of FIG. 3 with the container 14 of FIGS. 1 and 2, we have assumed that it is desired to normally maintain food in the container 14 at a temperature of zero degrees, and that is subsequently desired to either thaw the food or to heat the food. In order to maintain the food and container 14 at zero degrees, the movable contact of the heat switch 34 is connected to the "off" contact. This energizes the movable contact of the cold switch 36. The movable contact of the cold switch 36 is connected to the 0 degree contact which energizes the 0 degrees thermostat 37 and thereby energizes the refrigerating means 30. As long as the temperature of the container 14 is above zero degrees, the refrigerating means 30 is energized to cool the container 14. When the temperature of the container 14 reaches zero degrees, the thermostat 37 opens. If it is desired to thaw the food in the container 14, the movable contact of the cold switch 36 may be connected to the 38 degrees contact to energize the 38 degrees thermostat 40. In this case, no refrigeration is called for until the temperature in the container 14 reaches and exceeds 38 degrees Fahrenheit. After this temperature is reached, the refrigerating means 30 operates to maintain the temperature in the container 14 at 38 degrees. Or, if it is desired to heat the food in the container 14 to some temperature, say 165 degrees Fahrenheit which is a desirable temperature for serving foods to be eaten, the movable contact of the heat switch 34 may be connected to the "on" contact. This serves to de-energize the cold switch 36, and energize the heating means 20. The heating means 20 (the heater rods 21 in FIG. 2) are energized to heat the container 14.

While we have shown only one electrical circuit for our improved container 14, persons skilled in the art will appreciate that other circuits may be provided. For example, the heat switch 34 may be provided with a third fixed contact for energizing the heating means 20 in a different manner to provide a higher or lower temperature. Likewise, the cold switch 36 may be provided with a third fixed contact and a thermostat for providing a different refrigeration temperature.

Figure 4:
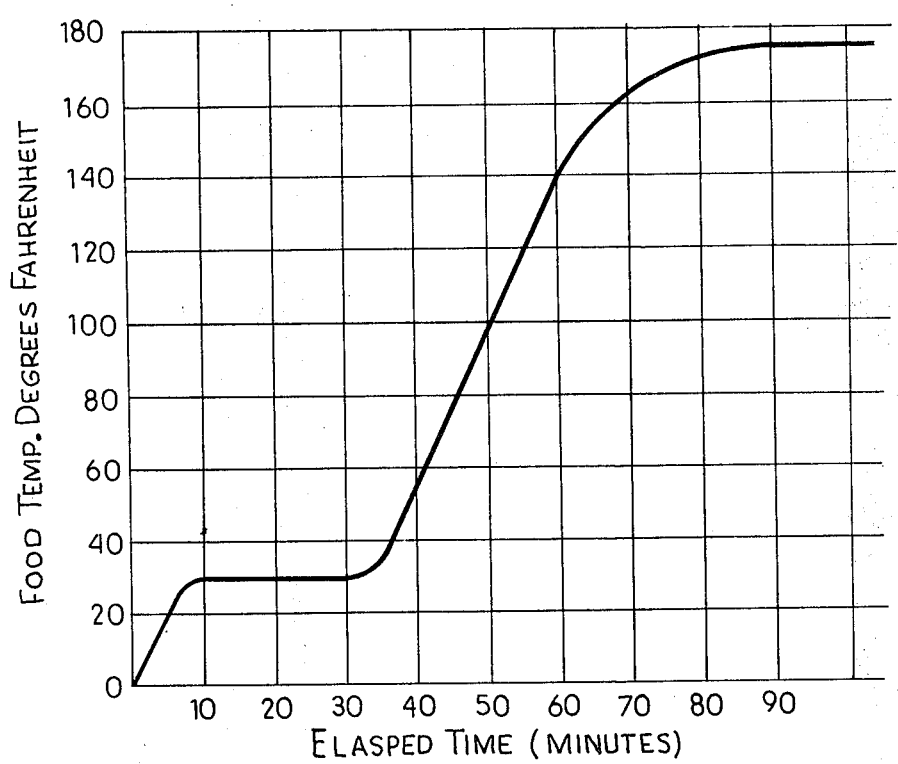
FIG. 4 shows a graph illustrating the operation of a container constructed in accordance with our invention.

In one embodiment of the container 14, we constructed the container 14 to have a volume of approximately twelve cubic feet. The heating means 20 had a heating capacity of approximately 3,300 watts, and the refrigerating means 30 had a one-third horsepower compressor. With the electrical circuit set to energize the refrigerating means 30, a full container of food was maintained at a temperature of zero degrees Fahrenheit. When the electrical circuit was set to energize the heating means 20, approximately 90 minutes were required to bring the temperature of the food in the container 14 up to 175 degrees Fahrenheit. This temperature change as a function of elapsed time is shown in FIG. 4. Thus, it is possible to maintain the temperature of food in the container at zero degrees, and on a very short notice raise the temperature of all the food in the container 14 to a heated temperature of 175 degrees Fahrenheit. In FIG. 4, a plateau or flat portion of temperature occurred at approximately 32 degrees between ten and thirty minutes, this being the time required to convert the food from a frozen condition at its frozen temperature to a thawed condition at the same temperature. It will be noted that the food was all thawed after an elapsed time of approximately thirty-five minutes.

It will thus be seen that our invention provides a new and improved food container which permits food to be kept at selected cold temperatures and selected warm temperatures or hot temperatures. Our container can also be used to freeze foods, as well as to maintain foods at cold temperatures and then warm or heat such foods. While we have shown only one embodiment of our invention, persons skilled in the art will appreciate that modifications may be made. For example, the container 14 may have various shapes, and the heating means 20 and the cooling means 25 may have various configurations and capacities. Various temperatures may be provided by the thermostats. The heating means 20 may have a thermostat. The electrical circuit may have various configurations. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved container for selectively maintaining foods at hot and cold temperatures, comprising:

(a) a base for said container;

(b) electrical heating means rated in excess of 1000 watts and positioned on a selected area of said base;

(c) a bottom positioned over said electrical heating means and covering said selected area;

(d) side walls positioned on said bottom at the edges thereof around the perimeter of said selected area, said side walls being fastened at their lower edges to said bottom, said side walls extending vertically upward from said bottom, and said side walls being fastened to each other along their vertical edges to form a container that is closed at the sides and bottom;

(e) cooling means positioned on each of said side walls;

(f) electrically operated refrigerating means mounted on said base and connected to said cooling means;

(g) electrical means mounted on said container for alternatively energizing said electrical heating means to heat said container and for alternatively energizing said electrically operated refrigerating means to cool said container; and (h) at least two thermostatic switches alternatively effective to cause said cooling means to maintain the temperature inside said container at two predetermined temperatures the thermostat operative too maintain the lower of the two predetermined temperatures being positioned near the top of one of said side walls and the thermostat operative to maintain the higher of the two predetermined temperatures being positioned near said bottom.

2. The improved container of claim 1 wherein said cooling means are positioned on the outer faces of said side walls, and further comprising insulation positioned around said cooling means, and outer walls positioned on said base around the edge thereof and around said insulation.

3. The improved container of claim 2 wherein said base and said selected area are substantially rectangular, and wherein said side walls form a rectangular container.

4. The improved container of claim 2 wherein said electrical means comprise a first switch having a first movable contact that selectively engages one of first and second fixed contacts, means connecting said first fixed contact to said electrical heating means, a second switch having a second movable contact connected to said second fixed contact and that selectively engages one of third and fourth fixed contacts, said thermostatic switches respectively connected between said third and fourth fixed contacts and said refrigerating means.

References Cited
UNITED STATES PATENTS

| | | | |
|---|---|---|---|
| 2,406,080 | 8/1946 | Laird | 165—24 |
| 2,504,794 | 4/1950 | Berman | 165—64 |
| 3,094,164 | 6/1963 | Sherman | 165—30 |
| 3,255,812 | 6/1966 | Bayane | 165—48 |

WILLIAM J. WYE, Primary Examiner

U.S. Cl. X.R.

165—48, 58, 64